(12) United States Patent
Krakhman

(10) Patent No.: US 11,624,640 B2
(45) Date of Patent: Apr. 11, 2023

(54) CORIOLIS EFFECT-BASED MASS FLOW METERS/CONTROLLERS USING OPTICAL SENSING AND METHODS HAVING IMPROVED ACCURACY

(71) Applicant: Illinois Tool Works Inc., Glenview, IL (US)

(72) Inventor: Vladimir Krakhman, Chalfont, PA (US)

(73) Assignee: Illinois Tool Works Inc., Glenview, IL (US)

( * ) Notice: Subject to any disclaimer, the term of this patent is extended or adjusted under 35 U.S.C. 154(b) by 369 days.

(21) Appl. No.: 16/906,222

(22) Filed: Jun. 19, 2020

(65) Prior Publication Data

US 2021/0396564 A1 Dec. 23, 2021

(51) Int. Cl.
  *G01F 1/78* (2006.01)
  *G01F 1/37* (2006.01)
  *G01F 1/7086* (2022.01)

(52) U.S. Cl.
  CPC ............. *G01F 1/78* (2013.01); *G01F 1/37* (2013.01); *G01F 1/7086* (2013.01)

(58) Field of Classification Search
  None
  See application file for complete search history.

(56) References Cited

U.S. PATENT DOCUMENTS 6,303,916 B1 10/2001 Gladnick
6,304,328 B1 10/2001 Longtin
7,117,751 B2 * 10/2006 Berger .............. G01F 1/8427
  73/861.355
7,168,329 B2 1/2007 Bell
(Continued)

FOREIGN PATENT DOCUMENTS

EP 1923675 5/2008
EP 2015034 1/2009
(Continued)

OTHER PUBLICATIONS

Int'l Search Report and Written Opinion Appln No. PCT/US2021/033876 dated Aug. 18, 2021.
(Continued)

*Primary Examiner* — Harshad R Patel
(74) *Attorney, Agent, or Firm* — McAndrews, Held & Malloy, Ltd.

(57) ABSTRACT

An example optical measurement system includes: a first light source configured to emit a first light beam; a first optical sensor configured to output first measurements based on detecting the first light beam; a second light source configured to emit a second light beam; a second optical sensor configured to output second measurements based on detecting the second light beam, wherein the first measurements and the second measurements comprise variable components; a third optical sensor configured to output third measurements based on detecting the second light beam or a third light beam, wherein the third measurements comprise a first steady state component; and a compensation circuit configured to control a first light output of the first light beam and a second light output of the second light beam by controlling current to the first light source and the second light source based on the third measurements.

19 Claims, 6 Drawing Sheets

(56) References Cited

U.S. PATENT DOCUMENTS

| | | | |
|---|---|---|---|
| 7,677,112 | B2 | 3/2010 | Mehendale |
| 10,809,183 | B2 * | 10/2020 | Freese .................. G01N 21/274 |
| 10,830,787 | B2 * | 11/2020 | Challener ............. G01P 15/097 |
| 2005/0150311 | A1 | 7/2005 | Berger |
| 2010/0094570 | A1 | 4/2010 | Gonia |
| 2010/0122585 | A1 | 5/2010 | Brouwer |
| 2015/0156298 | A1 * | 6/2015 | Ikemoto ............ H04M 1/72403 |
| | | | 455/556.1 |
| 2018/0113014 | A1 | 4/2018 | Singer |

FOREIGN PATENT DOCUMENTS

| | | |
|---|---|---|
| EP | 2034280 | 3/2009 |
| JP | S58206924 | 12/1983 |
| WO | 9313391 | 7/1993 |

OTHER PUBLICATIONS

Prokeš, A., Influence of Temperature Variation on Optical Receiver Sensitivity and its Compensation, Dept. of Radio Electronics, Brno Univ. of Tech., Radioengineering, vol. 16, No. 3, Sep. 2007, pp. 13-18.

Tulloch, S., Instrument Science Group Royal Greenwich Observatory, The Design and Use of LED Reference Light Sources for Q.E Calibration, RGO Technical Note 107 Nov. 6, 1996, pp. 1-17.

Wang, Wei-Chih, Optical Detectors, Dept. of Power Mechanical Engineering National Tsing Hua Univ., pp. 1-38.

Chughtai, Muhammad Tajammal, Temperature Compensated Bias Supply Circuit for Photodiodes, University of Hail, Hail, Kingdom of Saudi Arabia, Przegląd Elektrotechniczny, ISSN 0033-2097, R. 94 NR Oct. 2018, pp. 207-209.

Int'l Search Report and Written Opinion Appln No. PCT/US2021/023681 dated Jun. 22, 2021.

* cited by examiner

CORIOLIS EFFECT-BASED MASS FLOW METERS/CONTROLLERS USING OPTICAL SENSING AND METHODS HAVING IMPROVED ACCURACY

BACKGROUND

This disclosure relates generally to mass flow measurement and control and, more particularly, to mass flow meters/controllers and methods having improved accuracy.

Coriolis effect-based mass flow meters measure mass flow of media by determining a phase difference between different portions of a flow tube through which the media flows.

SUMMARY

Mass flow meters/controllers having improved accuracy, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
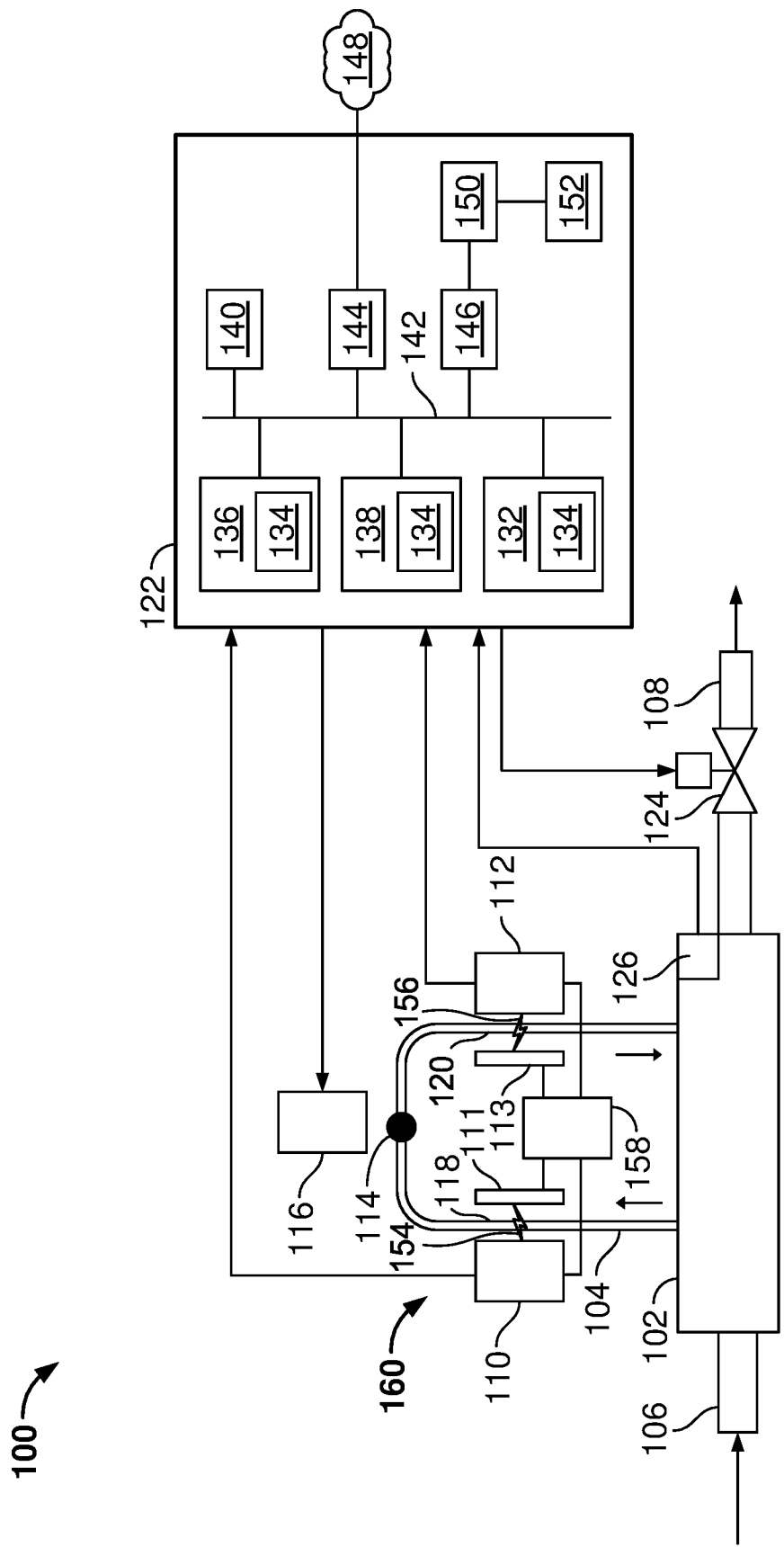
FIG. 1 is a schematic diagram of an example mass flow meter/controller, in accordance with aspects of this disclosure.

For Coriolis-effect flow meters, optical sensor temperature stability is a factor affecting the measurement accuracy. Each optical sensor, such as a photodiode or a phototransistor, involves a light source, such as a light emitting diode (LED). Both LEDs and optical sensors have characteristics that are at least partially dependent on ambient temperature. For example, luminance intensity of an LED may vary with temperature while excited using the same excitation current.

Conventional techniques for temperature compensation using for LEDs and optical sensors include operating the LED under constant current, operating LEDs under constant temperature, biasing the LED using temperature compensation circuits, and compensating the optical sensor output for temperature. Furthermore, optical sensors trend toward reduced sensitivity and LEDs toward reduced luminance intensity over long periods of time.

Constant temperature operation involves additional components such as a heater/cooler, power sources, and control circuits. Such techniques are not acceptable for low power devices, power sensitive devices, and/or space-limited devices. Conventional temperature compensation circuits require a temperature monitor and a processor executing compensation algorithms. Because luminance intensity is a nonlinear function of temperature, conventional temperature compensation circuits do not fully compensate for changes in temperature.

Disclosed example systems and methods decouple the light intensity of the light source from the temperature of the light sources, providing a stable source of light for measurement by the optical sensors. In some examples, a Coriolis-effect flow meter includes a third optical sensor in addition to two other optical sensors used for the phase/time difference measurements of the Coriolis-effect flow meter. The third optical sensor is not engaged with vibrating tube. As a result, the output of the third optical sensor is not modulated by the flow tube, and is proportional only to the emitted luminance of the light beam.

In some disclosed systems and methods, a third optical sensor light emitter (LED) is connected in series with the two other optical sensor light emitters used to generate phase/time difference measurements. In disclosed examples, the excitation current for all of the light sources of the optical sensors is identical and under closed-loop control. The excitation current is controlled to stabilized light intensity from the light sources regardless of temperature, aging, and/or any other disturbances in the circuits. All three optical sensors may be located close to each other such that a temperature difference between all optical sensors is reduced or minimized.

In some examples, the stability of light intensity depends primarily on a stability of a reference signal and total control loop gain value. Any changes in the light intensity due to a temperature variation or components edging are compensated by the control loop. Since all three optical sensor LEDs are connected in series, the light stabilization for the third sensor provides light stabilization for two other optical sensors.

In some disclosed examples, a second optical sensor is added to receive light from one the light sources, and provides a closed-loop control signal for luminance intensity stabilization of the light sources. In such examples, the number of light sources may be reduced to two. In some examples, additional optical sensors are added to both light sources, and the outputs of the optical sensors is averaged, combined, or otherwise filtered to provide feedback for luminance stabilization. Two outputs averaged signal provides better accuracy of compensation since both optical sensor variations are included into control loop.

By improving temperature stability, disclosed systems and methods substantially improve metrological characteristics of Coriolis-effect flow meters, which depend on stability and accuracy of optical sensors. By improving temperature stability of the light sources and optical sensors, disclosed systems and methods improve overall precision of the flow meter.

As used herein, the term "substantially constant output" of a light source refers to an output that has a degree of consistency equal to or better than a degree of consistency of a reference signal used to control the output.

Disclosed example optical measurement systems include: a first light source configured to emit a first light beam; a first optical sensor configured to output first measurements based on detecting the first light beam; a second light source configured to emit a second light beam; a second optical sensor configured to output second measurements based on detecting the second light beam, wherein the first measurements and the second measurements comprise variable components; a third optical sensor configured to output third measurements based on detecting the second light beam or a third light beam, wherein the third measurements comprise a first steady state component; and a compensation circuit configured to control a first light output of the first light beam and a second light output of the second light beam by controlling one or more currents to the first light source and the second light source based on the first steady state component of the third measurements.

Some example optical measurement systems further include: a flow tube configured to direct a fluid from an inlet of the flow tube to an outlet of the flow tube; and an actuator configured to cause a vibration in the flow tube, in which a first variable component of the first measurements is based on the vibration at a first location on the flow tube, and a second variable component of the second measurements is based on the vibration at a second location on the flow tube.

In some example optical measurement systems, the first optical sensor is configured to output the first measurements of a first position of the first location on the flow tube based on detecting the first light beam, and the second optical sensor is configured to output the second measurements of a second position of the second location on the flow tube based on detecting the second light beam. Some example optical measurement systems further include control circuitry configured to determine at least one of a mass flow rate through the flow tube or a density of the fluid in the flow tube based on the first measurements and the second measurements. In some example optical measurement systems, the first location on the flow tube is positioned at least partially between the first light source and the first optical sensor, and the second location on the flow tube is positioned at least partially between the second light source and the second optical sensor.

Some example optical measurement systems further include a fourth optical sensor configured to output fourth measurements based on detecting the first light beam or a fourth light beam, in which the fourth measurements include a second steady state component, and in which the compensation circuit includes a filter circuit configured to filter the first and second steady state components, and to control the one or more currents to the first light source and the second light source based on the filtered first and second steady state components.

In some example optical measurement systems, the compensation circuit is configured to control the first light source and the second light source to output a substantially constant output over a range of temperatures of the first light source and the second light source. In some example optical measurement systems, the first light source includes a first light emitting diode (LED) and the second light source comprises a second LED. In some example optical measurement systems, the first LED and the second LED are coupled in series and have a same excitation current, wherein the compensation circuit is configured to control the excitation current.

In some example optical measurement systems, the compensation circuit is configured to compare the third measurements to a reference, and control the one or more currents based on the comparison. In some example optical measurement systems, the first, second, and third optical sensors are thermally coupled. Some example optical measurement systems further include a third light source configured to output the third light beam, wherein the third optical sensor configured to output the third measurements based on detecting the third light beam.

Other disclosed example optical measurement systems include: a first light source configured to emit a first light beam; a first optical sensor configured to output first measurements based on detecting the first light beam; a second light source configured to emit a second light beam; a second optical sensor configured to output second measurements based on detecting the second light beam, wherein the first measurements and the second measurements comprise variable components; a third light source configured to emit a third light beam; a third optical sensor configured to output third measurements based on detecting the third light beam, wherein the third measurements comprise a first steady state component; and a compensation circuit configured to control a first light output of the first light beam and a second light output of the second light beam by controlling one or more currents to the first light source and the second light source based on the first steady state component of the third measurements.

In some example optical measurement systems, the first light source includes a first light emitting diode (LED) and the second light source includes a second LED. In some example optical measurement systems, the first LED, the second LED, and the third LED are coupled in series and have a same excitation current, wherein the compensation circuit is configured to control the excitation current. In some example optical measurement systems, the compensation circuit is configured to compare the third measurements to a reference, and control the one or more currents based on the comparison.

Some example optical measurement systems further include: a flow tube configured to direct a fluid from an inlet of the flow tube to an outlet of the flow tube; and an actuator configured to cause a vibration in the flow tube, in which a first variable component of the first measurements is based on the vibration at a first location on the flow tube, and a second variable component of the second measurements is based on the vibration at a second location on the flow tube.

In some example optical measurement systems, the first optical sensor is configured to output the first measurements of a first position of the first location on the flow tube based on detecting the first light beam, and the second optical sensor is configured to output the second measurements of a second position of the second location on the flow tube based on detecting the second light beam. In some example optical measurement systems, the first location on the flow tube is positioned at least partially between the first light source and the first optical sensor, and the second location on the flow tube is positioned at least partially between the second light source and the second optical sensor.

Disclosed example methods to perform optical measurements involve: emitting a first light beam via a first light source; performing first measurements by detecting the first light beam via a first optical sensor; emitting a second light beam via a second light source; performing second measurements by detecting the second light beam via a second optical sensor, wherein the first measurements and the second measurements comprise variable components; performing third measurements by detecting the second light beam or a third light beam via a third optical sensor, wherein the third measurements comprise a first steady state component; and compensating a first light output of the first light beam and a second light output of the second light beam by controlling one or more currents to the first light source and the second light source based on the first steady state component of the third measurements.

Some example methods involve: directing fluid from an inlet of a flow tube to an outlet of the flow tube; causing a vibration in the flow tube, wherein a first variable component of the first measurements is based on the vibration at a first location on the flow tube, and a second variable component of the second measurements is based on the vibration at a second location on the flow tube; and determining, based on the first measurements and the second measurements, at least one of a mass flow rate within the flow tube or a density of the fluid within the flow tube.

In some example methods, the first measurements are representative of a first position of the first location on the flow tube based on detecting the first light beam, the second measurements are representative of a second position of the second location on the flow tube based on detecting the second light beam. In some examples, the first location on the flow tube is positioned at least partially between the first light source and the first optical sensor, and the second location on the flow tube is positioned at least partially between the second light source and the second optical sensor.

Some example methods involve performing fourth measurements by detecting the first light beam or a fourth light beam, in which the fourth measurements include a second steady state component, and in which the compensating of the first light output of the first light beam and the second light output of the second light beam involves: filtering the first and second steady state components; and controlling the one or more currents to the first light source and the second light source based on the filtered first and second steady state components.

In some example methods, the compensating the first light output of the first light beam and the second light output of the second light beam involves control the first light source and the second light source to output a substantially constant output over a range of temperatures of the first light source and the second light source. In some example methods, the first light source includes a first light emitting diode (LED) and the second light source includes a second LED, the first light emitting diode and the second light emitting diode are coupled in series and have a same excitation current, and the compensating of the first light output of the first light beam and the second light output of the second light beam involves controlling the excitation current.

In some example methods, the compensating of the first light output of the first light beam and the second light output of the second light beam involves comparing the third measurements to a reference, and controlling the one or more currents based on the comparison. In some example methods, the first, second, and third optical sensors are thermally coupled.

FIG. 1 is a schematic diagram of an example mass flow meter/controller 100. The example mass flow meter/controller 100 of FIG. 1 may be used to measure mass flow and/or density of a fluid through a conduit connected in line with the mass flow meter/controller 100, and/or to control mass flow of a fluid through the conduit by controlling a valve.

The example mass flow meter/controller 100 includes a flow-through base 102, a flow tube 104, a fluid inlet 106, and a fluid outlet 108. The flow tube 104 directs a fluid from the fluid inlet 106 of the flow tube 104 to the fluid outlet 108 of the flow tube 104. To measure mass flow and/or density of the fluid flowing through the flow tube 104, the example mass flow meter/controller 100 includes multiple optical sensors 110, 112 (also referred to herein as "photo sensors"), multiple light sources 111, 113, an actuator to cause vibration in the flow tube 104 (e.g., a permanent magnet 114 and a driving coil 116), and control circuitry 122. To reduce measurement error, the example mass flow meter/controller 100 further includes a temperature sensor 126.

The flow tube 104 is configured in a U-shape. The driving coil 116 generates an alternating magnetic field, which creates a driving force on the permanent magnet 114, which is attached to the flow tube 104 and transfers the driving force to the flow tube 104 to result in a vibration in the flow tube 104. The flow tube 104 vibrates at a frequency, and the control circuitry 122 may control the driving coil 116 to cause the vibration frequency to approximate the natural oscillation frequency of the flow tube 104. Moving media (e.g., gas or liquid) inside the flow tube 104 creates a Coriolis force, which causes a phase shift between a first location 118 on the flow tube 104 that is upstream and a second location 120 on the flow tube 104 that is downstream. The optical sensors 110, 112 measure the positions of the flow tube 104 at the first and second locations 118, 120 and output respective signals (e.g., measurements) having the same frequency, but having a phase or time difference. The first location 118 on the flow tube 104 is positioned at least partially between the first light source 111 and the first optical sensor 110, and the second location 120 on the flow tube 104 is positioned at least partially between the second light source 113 and the second optical sensor 112.

The example control circuitry 122 determines a mass flow rate through the flow tube 104 and/or a density of the fluid in the flow tube 104 based on first measurements from the optical sensor 110 and second measurements from the optical sensor 112. In some examples, the control circuitry 122 controls a mass flow rate through the flow tube 104 using a flow control valve 124. The control circuitry 122 may control the flow control valve 124 based on a comparison of a desired flow rate and the measured flow rate, and may include one or more control loops, such as a proportional-integral-derivative (PID) controller, and/or one or more filters.

The example control circuitry 122 of FIG. 1 may be a general-purpose computer, a laptop computer, a tablet computer, a mobile device, a server, an embedded device, and/or any other type of computing device.

The example control circuitry 122 of FIG. 1 includes a processor 132. The example processor 132 may be any general purpose central processing unit (CPU) from any manufacturer. In some other examples, the processor 132 may include one or more specialized processing units, such as graphic processing units and/or digital signal processors. The processor 132 executes machine readable instructions 134 that may be stored locally at the processor (e.g., in an included cache), in a random access memory 136 (or other volatile memory), in a read only memory 138 (or other non-volatile memory such as FLASH memory), and/or in a mass storage device 140. The example mass storage device 140 may be a hard drive, a solid state storage drive, a hybrid drive, a RAID array, and/or any other mass data storage device.

A bus 142 enables communications between the processor 132, the RAM 136, the ROM 138, the mass storage device 140, a network interface 144, and/or an input/output interface 146.

The example network interface 144 includes hardware, firmware, and/or software to connect the control circuitry 122 to a communications network 148 such as the Internet. For example, the network interface 144 may include IEEE 802.X-compliant wireless and/or wired communications hardware for transmitting and/or receiving communications.

The example control circuitry 122 may access a non-transitory machine readable medium 152 via the I/O interface 146 and/or the I/O device(s) 150. Examples of the machine readable medium 152 of FIG. 1 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

To determine the mass flow rate, the example control circuitry 122 may use the mass flow equation shown in Equation 1 below:

$$MF = FCF * \Delta t \qquad \text{(Equation 1)}$$

In Equation 1, MF is the mass flow (e.g., kilograms/second (kg/s), FCF is the flow calibration factor, which is a constant for a specific device (e.g., based on a calibration), and $$\Delta t = \frac{\theta}{2\pi F},$$

in which Θ is the phase difference between the output signals from the optical sensors 110, 112, and F is the natural oscillation frequency of the flow tube 104.

The example light sources 111, 113 are configured to emit respective light beams 154, 156, and the optical sensors 110, 112 are configured to output measurements based on detecting the respective light beams 154, 156. The vibration of the flow tube 104 modulates the light beams 154, 156, which causes modulation of the measurement signals output by the optical sensors 110, 112.

As mentioned above, the optical sensors 110, 112 (e.g., the LED(s) and the photodiode(s) of the optical sensors 110, 112) have characteristics that may change as a function of temperature. A higher variability in the output signals from the optical sensors 110, 112 due to changes in temperature can reduce the accuracy of measurements and/or control by the mass flow meter/controller 100. To stabilize the output over a range of temperatures, whether short-term or long-term changes, the example mass flow meter/controller 100 includes a compensation circuit 158 coupled to the optical sensors 110, 112. The compensation circuit 158 controls the light output of the light beams 154, 156 by controlling one or more currents to the light sources 111, 113 based on a steady state component(s) of one or more outputs of the optical sensors 110, 112.

The example compensation circuit 158 has the advantage of avoiding using the modulated output signals of the optical sensors 110, 112. Instead, the compensation circuit 158 uses one or more signals that have steady state components representative of the light output but do not require filtering of modulated signals, which can be imperfect and result in noise in the light output compensation. In some examples, the light sources 111, 113 are coupled to share an excitation current (e.g., coupled in series) to reduce the number of variables between the light sources 111, 113. The optical sensors 110, 112, the light sources 111, 113, and the compensation circuit 158 form part of an optical measurement circuit 160, as disclosed in more detail below. Example implementations of the optical measurement circuit 160 and the compensation circuit 158 are disclosed below with reference to FIGS. 2-5.

Figure 2:
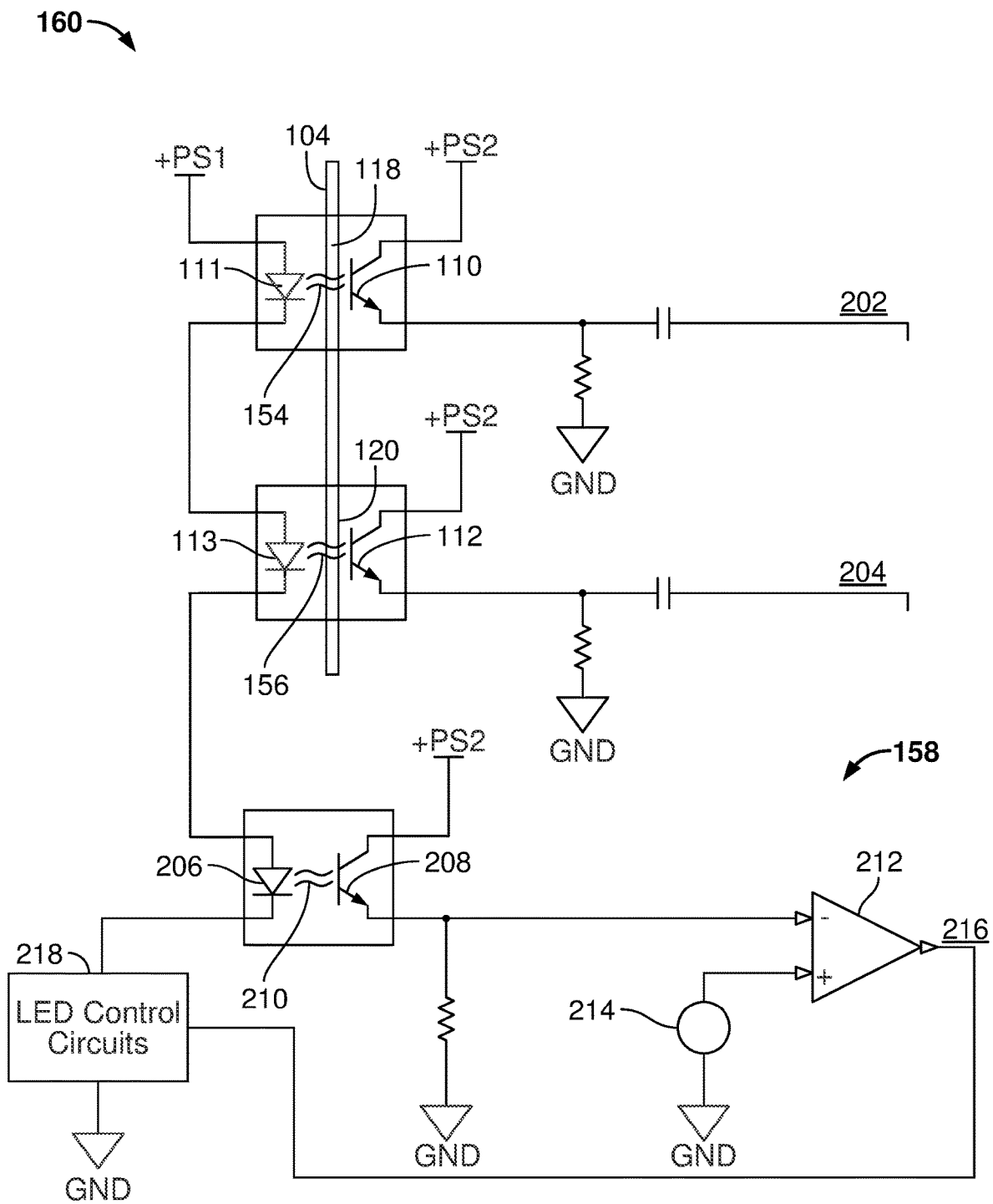
FIG. 2 is a circuit diagram of an example implementation of the optical sensors, the light sources, and the compensation circuit of FIG. 1.

FIG. 2 is a circuit diagram of an example implementation of the optical sensors 110, 112, the light sources 111, 113, the optical measurement system 160, and the compensation circuit 158 of FIG. 1. In the example of FIG. 2, the first optical sensor 110 outputs first measurements 202 based on detecting the first light beam 154, which is modulated by the first location 118 of the flow tube 104. The second optical sensor 112 outputs second measurements 204 based on detecting the second light beam 156, which is modulated by the second location 120 of the flow tube 104.

The first and second measurements 202, 204 may be output to the control circuitry 122 of FIG. 1 for determining a mass flow rate through the flow tube 104 and/or a density of the fluid in the flow tube 104 based on the first measurements 202 and the second measurements 204.

The example optical measurement system 160 of FIG. 2 includes a third light source 206 and a third optical sensor 208 configured to provide an output for compensating the light sources 111, 113 and/or the optical sensors 110, 112 for variability due to temperature, aging, and/or any other causes. The light sources 111, 113 are coupled in series and are both coupled in series with the third light source 206, such that compensating for changes in the output of the third light source 206 results in compensation of the light sources 111, 113.

The optical sensor 208 measures a third light beam 210 output by the light source 206, which is not modulated by the flow tube 104. As a result, the output of the optical sensor 208 has a steady state component and does not have a substantial variable component. Instead, the steady state component is representative of the steady state output of the light source 206, which may be assumed to be representative of the light output of the light sources 111, 113. In the example of FIG. 2, the light sources 111, 113, 206 share an excitation current (e.g., forward current). In some examples, the light sources 111, 113, 206 may be arranged to limit (e.g., reduce, minimize) any temperature gradient between the light sources 111, 113, 206 via thermally coupling the light sources 111, 113, 206.

The example compensation circuit 158 further includes a comparator-amplifier 212 configured to compare the output of the optical sensor 208 to a reference signal (e.g., a reference voltage 214), and to output a compensation signal 216 to an LED control circuit 218. In the example of FIG. 2, the compensation signal 216 is proportional to the difference between the output of the optical sensor 208 and the reference voltage 214. The LED control circuit 218 controls the excitation current to the light sources 111, 113, 206 based on the compensation signal 216. The stability of the light output of the light beams 154, 156, 210 depends on the stability of the voltage reference and the parameters of the comparator-amplifier 212, which may be configured as a PID controller and/or any other type of feedback loop.

Figure 3:
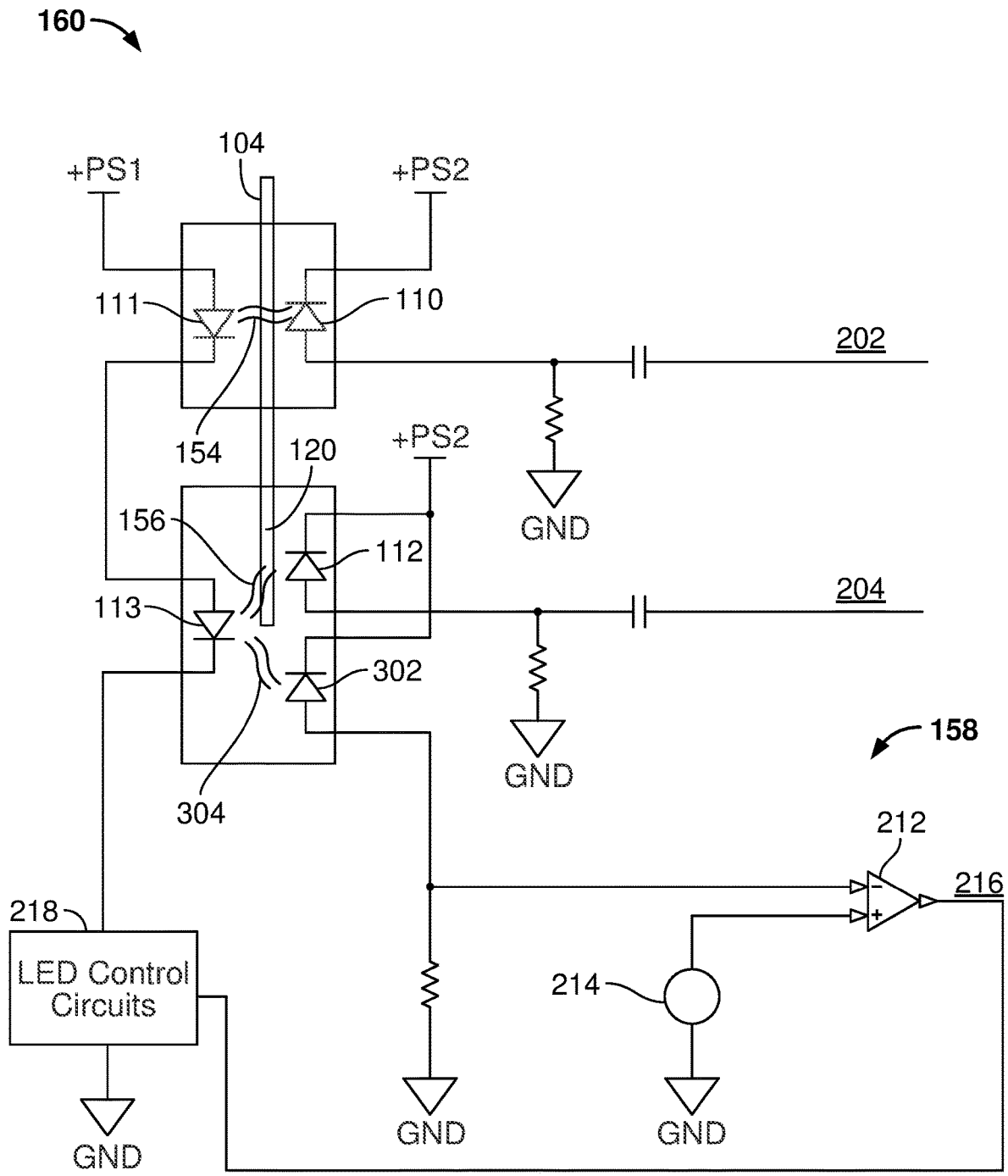
FIG. 3 is a circuit diagram of another example implementation of the optical sensors and compensation circuit of FIG. 1, including a third optical sensor coupled to one of the light sources.

FIG. 3 is a circuit diagram of another example implementation of the optical sensors 110, 112, the light sources 111, 113, the optical measurement system 160, and the compensation circuit 158 of FIG. 1. In the example of FIG. 3, the compensation circuit 158 includes a third optical sensor 302 that is coupled to one of the light sources 111, 113. In the example of FIG. 3, the optical sensors 110, 112, 302 are photodiodes.

Figure 5:
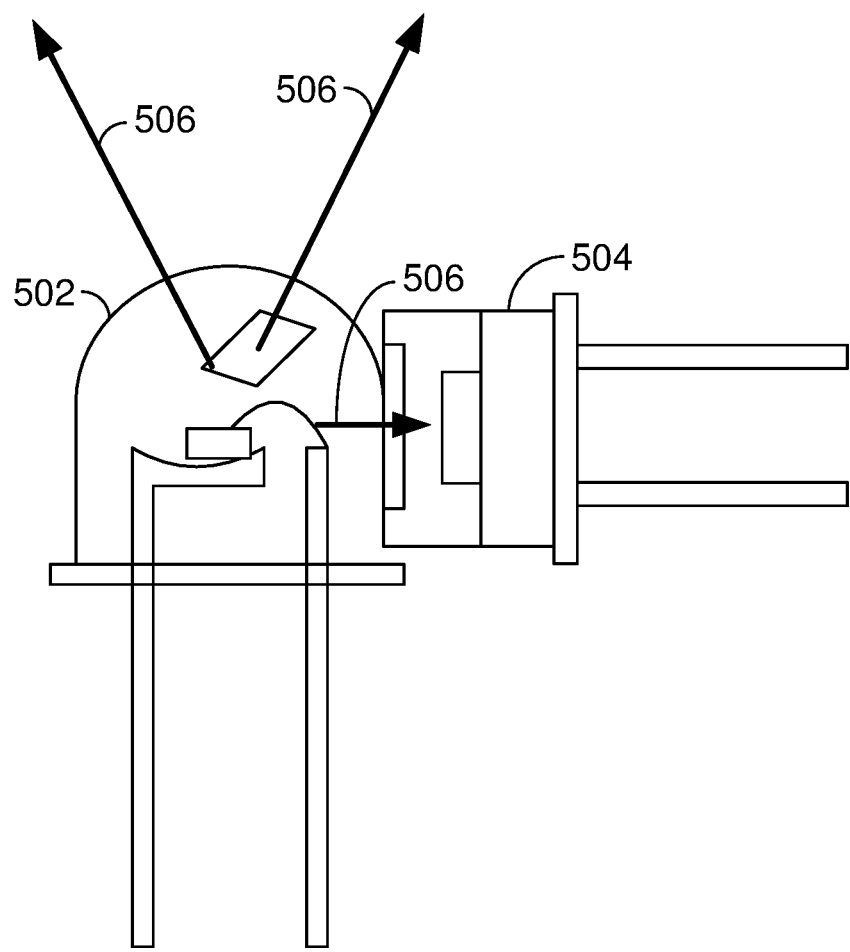
FIG. 5 illustrates an example implementation of a light source having an optical sensor coupled to receive light output by the light source.

Compared to the example of FIG. 2, the example implementation of FIG. 3 reduces the number of light emitters by coupling the third optical sensor 302 to the light source 113 (or the light source 111) such that a light beam 304 emitted by the light source 113 and measured by the third optical sensor 302 is not modulated by the flow measurement tube 104. For example, the third optical sensor 302 may be coupled directly to the output of the light source 113, as illustrated in FIG. 5 below. The output measurements of the optical sensor 302 are provided to the comparator-amplifier 212, which provides the compensation signal 216 as described above with reference to FIG. 2.

Figure 4:
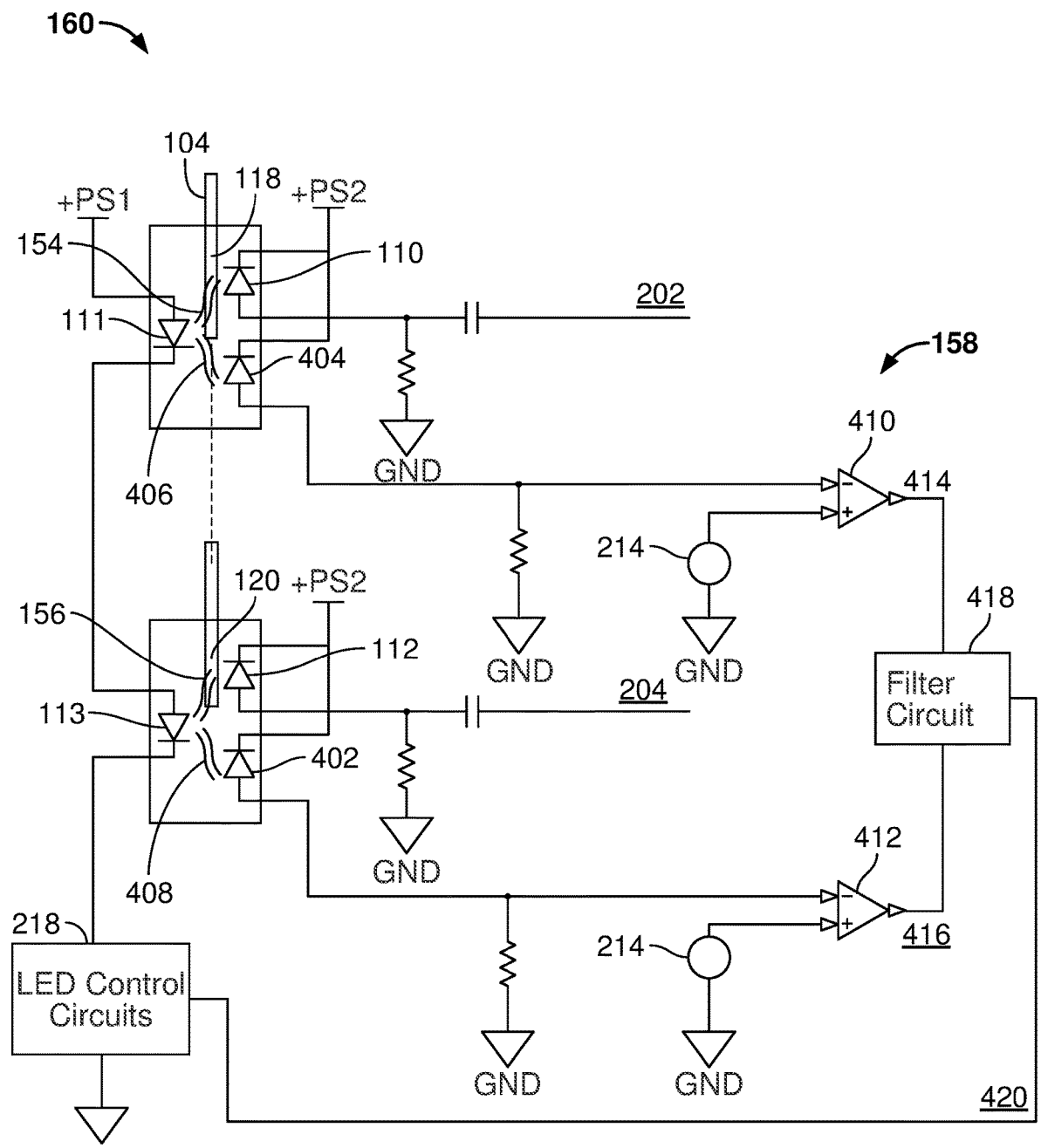
FIG. 4 is a circuit diagram of another example implementation of the optical sensors and compensation circuit of FIG. 1, including additional optical sensors coupled to each of the light sources.

The LED light intensity stabilization in the examples of FIGS. 2 and 3 is based on an assumption that all of the optical sensors 110, 112, 208 and/or 110, 112, 302 have substantially identical temperature characteristics (e.g., identical within a margin of measurement accuracy that is considered acceptable for a given application). However, there are some variations in characteristics from part to part. FIG. 4 is a circuit diagram of another example implementation of the optical sensors 110, 112, the light sources 111, 113, the optical measurement system 160, and the compensation circuit 158 of FIG. 1, which may be used to further reduce measurement error. In the example implementation of FIG. 4, the optical measurement system 160 includes additional optical sensors 402, 404.

The fourth optical sensor 404 is coupled to the first light source 111 such that a light beam 406 emitted by the first light source 111 and measured by the fourth optical sensor 404 is not modulated by the flow measurement tube 104. Similarly, the third optical sensor 402 is coupled to the second light source 113 such that a light beam 408 emitted by the second light source 113 and measured by the third optical sensor 402 is also not modulated by the flow measurement tube 104.

The fourth optical sensor 404 outputs measurements (e.g., a first steady-state component) to a first comparator-amplifier 410 and the third optical sensor 402 outputs measurements (e.g., a second steady-state component) to a second comparator-amplifier 412. The reference voltage 214 is coupled to both of the comparator-amplifiers 410, 412. The comparator-amplifier 410 outputs a compensation signal 414 proportional to the difference between the measurements by the fourth optical sensor 404 (e.g., the first steady-state components) and the reference voltage 214. Similarly, the comparator-amplifier 412 outputs a compensation signal 416 proportional to the difference between the measurements by the third optical sensor 402 (e.g., the second steady-state components) and the reference voltage 214. The compensation signals 414, 416 are input to a filter circuit 418, which filters the compensation signals 414, 416 to output a filtered compensation signal 420. In the example of FIG. 4, the filter circuit 418 averages the compensation signals 414, 416 to generate the filtered (e.g., averaged) compensation signal 420. However, other filter functions may be used instead of averaging.

The filter circuit 418 outputs the filtered compensation signal 420 to the LED control circuit 218, which controls the excitation current to the light sources 111, 113 (e.g., the light beams 406, 408).

FIG. 5 illustrates an example implementation of a light source 502 having an optical sensor 504 coupled to receive unmodulated light 506 output by the light source 502. The optical sensor 504 is attached directly to the light source 502 to having a high degree of coupling between the light source 502 and the optical sensor 504. Additionally, the coupling of the optical sensor 504 remains consistent to reduce or eliminate variation in the incidence of light 506 emitted by the light source 502 on the optical sensor 504.

Figure 6:
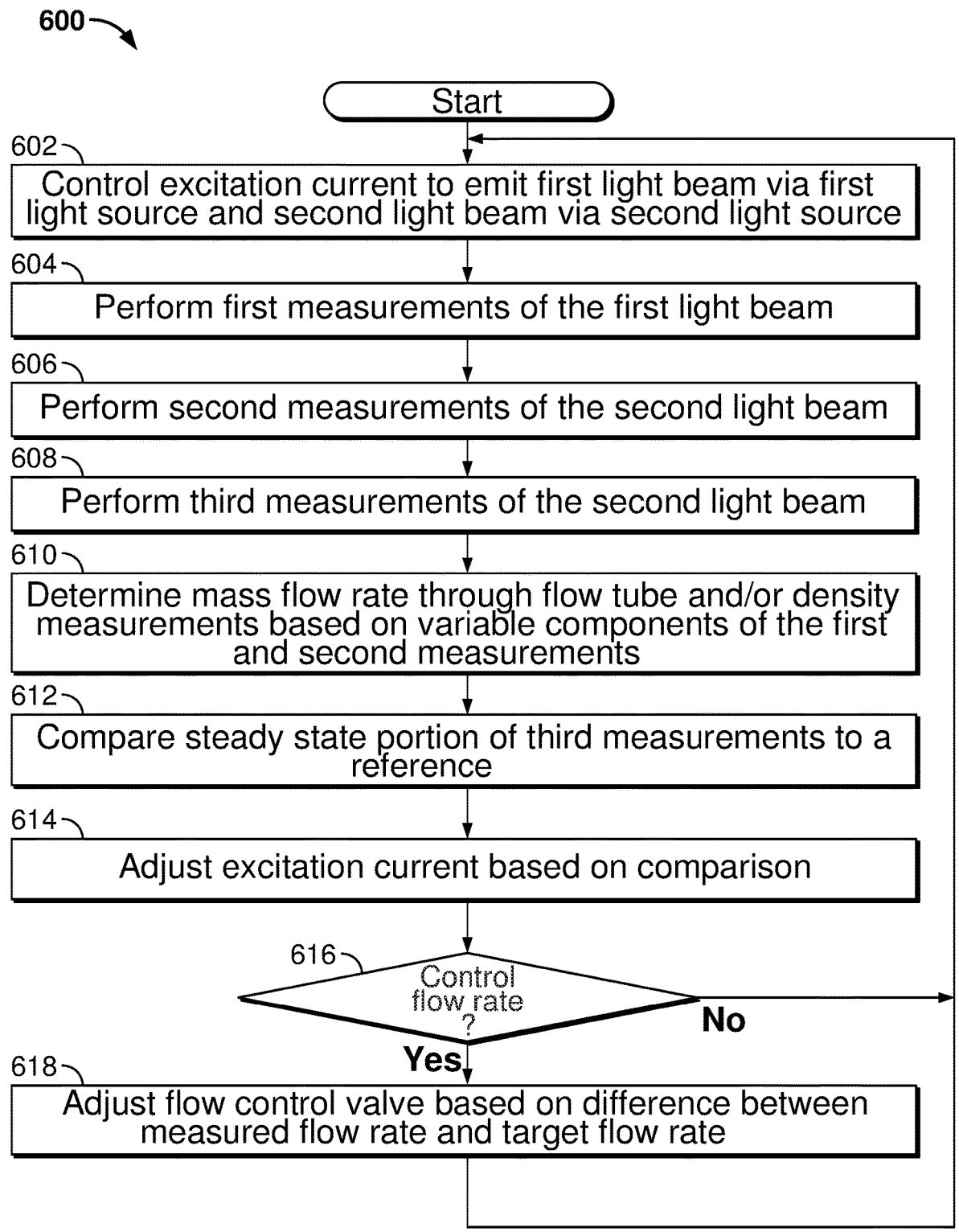
FIG. 6 is a flowchart representative of an example method that may be performed by the mass flow meter/controllers of FIGS. 1-4 to compensate optical sensors and/or light sources for changes in temperature and/or other effects.

FIG. 6 is a flowchart representative of an example method 600 that may be performed by the mass flow meter/controllers 100 and compensation circuits 158 of FIGS. 1-4 to compensate optical sensors and/or light sources for changes in temperature and/or other effects. The example method 600 is described below with reference to the mass flow meter/controller 100 of FIG. 1 and the compensation circuit 158 of FIG. 3. However, the method 600 may be performed with other devices having multiple optical sensors and/or different compensation circuits, such as the compensation circuits of FIGS. 2 and/or 4.

At block 602, the LED control circuit 218 controls the excitation current to the light sources 111, 113 to emit the first light beam 154 via the first light source 111 and emit the second light beam 156 via the second light source 113. In the example of FIG. 3, the light sources 111, 113 are in series and have the same excitation current.

At block 604, the first optical sensor 110 performs first measurements of the first light beam 154. For example, the first light beam 154 may be modulated by the flow tube 104, and the modulated light beam is measured by the first optical sensor 110 and output to the control circuitry 122 of FIG. 1.

At block 606, the second optical sensor 112 performs first measurements of the second light beam 156. For example, the second light beam 156 may be modulated by the flow tube 104, and the modulated light beam is measured by the second optical sensor 112 and output to the control circuitry 122.

At block 608, the third optical sensor 302 performs third measurements of the second light beam 156 (or the first light beam 154). In contrast with the measurements by the second optical sensor 112, the measurements of the second light beam 156 by the third optical sensor 302 are not modulated by the flow tube 104, and the third optical sensor 302 outputs the measurements (e.g., a steady state component) to the comparator-amplifier 212.

At block 610, the control circuitry 122 (e.g., via the processor 132) determines a mass flow rate through the flow tube 104 and/or a density measurement based on the variable components of the first and second measurements by the first and second optical sensors 110, 112. For example, the control circuitry 122 may calculate the mass flow rate based on a phase difference between the first and second measurements, and/or calculate a density of the fluid based on the frequency of the vibration in the flow tube 104.

At block 612, the comparator-amplifier 212 compares the steady state portion of the third measurements to a reference. For example, the comparator-amplifier 212 compares the measurements from the third optical sensor 302 to the reference voltage 214 to generate the compensation signal 216. The example compensation signal 216 is proportional to a difference between the steady state portion of the measurements from the third optical sensor 302 and the reference voltage 214.

At block 614, the LED control circuit 218 adjusts the excitation current based on the comparison (e.g., based on the compensation signal 216).

At block 616, the control circuitry 122 determines whether the flow rate is to be controlled. For example, a mass flow controller may be configured to control the flow rate, while a mass flow meter omits controlling the flow rate. If the flow rate is to be controlled (block 616), the control circuitry 122 adjusts the flow control valve 124 based on the difference between the measured flow rate and a target flow rate.

After adjusting the flow control valve (block 618), or if the flow control rate is not being controlled (block 616), control returns to block 602 to continue measurement and/or control.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise one or more application specific integrated circuit or chip. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present methods and/or systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, blocks and/or components of disclosed examples may be combined, divided, re-arranged, and/or otherwise modified. Therefore, it is intended that the present method and/or system not be limited to the particular implementations disclosed, but that the present method and/or system will include all implementations falling within the scope of the appended claims.

What is claimed is:

1. An optical measurement system, comprising:
   a first light source configured to emit a first light beam;
   a first optical sensor configured to output first measurements based on detecting the first light beam;
   a second light source configured to emit a second light beam;
   a second optical sensor configured to output second measurements based on detecting the second light beam, wherein the first measurements and the second measurements comprise variable components;
   a third optical sensor configured to output third measurements based on detecting a third light beam emitted from the second light source, wherein the third measurements comprise a first steady state component representative of light intensities of the first light source and the second light source; and
   a compensation circuit configured to control a first light output of the first light beam and a second light output of the second light beam by controlling one or more currents to the first light source and the second light source based on the first steady state component of the third measurements.

2. The optical measurement system as defined in claim 1, further comprising:
   a flow tube configured to direct a fluid from an inlet of the flow tube to an outlet of the flow tube; and
   an actuator configured to cause a vibration in the flow tube, wherein a first variable component of the first measurements is based on the vibration at a first location on the flow tube, and a second variable component of the second measurements is based on the vibration at a second location on the flow tube.

3. The optical measurement system as defined in claim 2, wherein the first optical sensor is configured to output the first measurements of a first position of the first location on the flow tube based on detecting the first light beam, and the second optical sensor is configured to output the second measurements of a second position of the second location on the flow tube based on detecting the second light beam.

4. The optical measurement system as defined in claim 2, further comprising control circuitry configured to determine at least one of a mass flow rate through the flow tube or a density of the fluid in the flow tube based on the first measurements and the second measurements.

5. The optical measurement system as defined in claim 2, wherein the first location on the flow tube is positioned at least partially between the first light source and the first optical sensor, and the second location on the flow tube is positioned at least partially between the second light source and the second optical sensor.

6. The optical measurement system as defined in claim 1, wherein the compensation circuit is configured to control the first light source and the second light source to output a substantially constant output over a range of temperatures of the first light source and the second light source.

7. The optical measurement system as defined in claim 1, wherein the first light source comprises a first light emitting diode (LED) and the second light source comprises a second LED.

8. The optical measurement system as defined in claim 7, wherein the first LED and the second LED are coupled in series and have a same excitation current, wherein the compensation circuit is configured to control the excitation current.

9. The optical measurement system as defined in claim 1, wherein the compensation circuit is configured to compare the third measurements to a reference, and control the one or more currents based on the comparison.

10. The optical measurement system as defined in claim 1, wherein the first, second, and third optical sensors are thermally coupled.

11. The optical measurement system as defined in claim 1, further comprising a third light source configured to output the third light beam, wherein the third optical sensor configured to output the third measurements based on detecting the third light beam.

12. An optical measurement system comprising:
a first light source configured to emit a first light beam;
a first optical sensor configured to output first measurements based on detecting the first light beam;
a second light source configured to emit a second light beam;
a second optical sensor configured to output second measurements based on detecting the second light beam, wherein the first measurements and the second measurements comprise variable components;
a third optical sensor configured to output third measurements based on detecting a third light beam emitted from the second light source, wherein the third measurements comprise a first steady state component;
a fourth optical sensor configured to output fourth measurements based on detecting a fourth light beam emitted from the first light source, wherein the fourth measurements comprise a second steady state component; and
a compensation circuit comprising a filter circuit configured to filter the first and second steady state components, wherein the compensation circuit is configured to control the one or more currents to the first light source and the second light source based on the filtered first and second steady state components.

13. An optical measurement system, comprising:
a first light source configured to emit a first light beam;
a first optical sensor configured to output first measurements based on detecting the first light beam;
a second light source configured to emit a second light beam;
a second optical sensor configured to output second measurements based on detecting the second light beam, wherein the first measurements and the second measurements comprise variable components;
a third light source configured to emit a third light beam;
a third optical sensor configured to output third measurements based on detecting the third light beam, wherein the third measurements comprise a first steady state component representative of light intensities of the first light source and the second light source; and
a compensation circuit configured to control a first light output of the first light beam and a second light output of the second light beam by controlling one or more currents to the first light source and the second light source based on the first steady state component of the third measurements.

14. The optical measurement system as defined in claim 13, wherein the first light source comprises a first light emitting diode (LED) and the second light source comprises a second LED.

15. The optical measurement system as defined in claim 14, wherein the third light source comprises a third LED, wherein the first LED, the second LED, and the third LED are coupled in series and have a same excitation current, wherein the compensation circuit is configured to control the excitation current.

16. The optical measurement system as defined in claim 13, wherein the compensation circuit is configured to compare the third measurements to a reference, and control the one or more currents based on the comparison.

17. The optical measurement system as defined in claim 13, further comprising:
a flow tube configured to direct a fluid from an inlet of the flow tube to an outlet of the flow tube; and
an actuator configured to cause a vibration in the flow tube, wherein a first variable component of the first measurements is based on the vibration at a first location on the flow tube, and a second variable component of the second measurements is based on the vibration at a second location on the flow tube.

18. The optical measurement system as defined in claim 17, wherein the first optical sensor is configured to output the first measurements of a first position of the first location on the flow tube based on detecting the first light beam, and the second optical sensor is configured to output the second measurements of a second position of the second location on the flow tube based on detecting the second light beam.

19. The optical measurement system as defined in claim 17, wherein the first location on the flow tube is positioned at least partially between the first light source and the first optical sensor, and the second location on the flow tube is positioned at least partially between the second light source and the second optical sensor.

* * * * *